(12) United States Patent
Wang

(10) Patent No.: US 11,975,640 B2
(45) Date of Patent: May 7, 2024

(54) AUTOMOBILE SEAT CUSHION

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 127 days.

(21) Appl. No.: 17/783,597

(22) PCT Filed: Dec. 10, 2020

(86) PCT No.: PCT/CN2020/135186
§ 371 (c)(1),
(2) Date: Jun. 8, 2022

(87) PCT Pub. No.: WO2021/121117
PCT Pub. Date: Jun. 24, 2021

(65) Prior Publication Data
US 2023/0021375 A1     Jan. 26, 2023

(30) Foreign Application Priority Data

Dec. 16, 2019    (CN) .......................... 201922254483.9

(51) Int. Cl.
*B60N 2/56*      (2006.01)

(52) U.S. Cl.
CPC ..................... *B60N 2/56* (2013.01)

(58) Field of Classification Search
CPC ............ B60N 2/56; B60N 2/707; A47C 27/00
(Continued)

(56) References Cited

U.S. PATENT DOCUMENTS

| | | | |
|---|---|---|---|
| 3,391,413 A * | 7/1968 | Crane ................... | A47C 21/046 297/452.45 |
| 3,681,797 A * | 8/1972 | Messner ............... | A47C 27/144 5/652.2 |
| 5,226,188 A * | 7/1993 | Liou ...................... | A47C 7/742 5/653 |

FOREIGN PATENT DOCUMENTS

| | | |
|---|---|---|
| CN | 2681942 | 3/2005 |
| CN | 203046968 | 7/2013 |

(Continued)

OTHER PUBLICATIONS

International Search Report mailed in PCT/CN2020/135186 dated Feb. 26, 2021 (4 pages).

(Continued)

*Primary Examiner* — Milton Nelson, Jr.
(74) *Attorney, Agent, or Firm* — Wissing Miller LLP

(57) ABSTRACT

The present application provides an automobile seat cushion comprising: a body shaped like a flat sheet that has a top surface in contact with the buttocks of a user and a bottom surface in contact with an automobile seat; a plurality of protrusions that are distributed under the bottom surface of the body and provided to vertically protrude downward from the bottom surface, the plurality of protrusions being formed integrally with the body of the seat cushion; and a plurality of vertical ventilation holes that are formed to be recessed downward from the top surface of the body, the plurality of vertical ventilation holes and the plurality of protrusions being in one-to-one correspondence vertically, wherein each vertical ventilation hole of the plurality of vertical ventilation holes vertically extends downward beyond the bottom surface of the body from the top surface of the body, and enters into a corresponding protrusion but does not penetrate through a bottom of the corresponding protrusion, and wherein each protrusion of the plurality of protrusions is provided with a horizontal ventilation hole that penetrates through at least one side surface of the protrusion, and the horizontal ventilation hole and the vertical ventilation hole meet and communicate with each other in the protrusion.

13 Claims, 3 Drawing Sheets

(58) Field of Classification Search
USPC .................................................. 297/452.46
See application file for complete search history.

(56) References Cited

FOREIGN PATENT DOCUMENTS

| CN | 203221905 | 10/2013 |
|----|-----------|---------|
| CN | 207136650 | 3/2018 |
| CN | 211493751 | 9/2020 |
| JP | H0976797 | 3/1997 |
| WO | 2008096956 | 8/2008 |

OTHER PUBLICATIONS

Written Opinion mailed in PCT/CN2020/135186 dated Feb. 26, 2021 (4 pages).

\* cited by examiner

AUTOMOBILE SEAT CUSHION

CROSS-REFERENCE TO RELATED APPLICATIONS

This application is a 371 of PCT/CN2020/135186 filed on Dec. 10, 2020, published on Jun. 24, 2021 under publication number WO 2021/121117 A1, which claims priority benefits from Chinese Patent Application No. 201922254483.9 filed Dec. 16, 2019, both of which are incorporated herein in their entirety by reference.

TECHNICAL FIELD

The present disclosure relates to a technical field of automobile articles, and particularly to an automobile seat cushion with an air permeability.

BACKGROUND ART

With improvement of people's living standards and popularization of automobile use, automobile seat cushions have increasingly become necessary consumables for automobile owners. Nowadays, automobile seat cushions made of various materials such as genuine leather, artificial leather, nylon, chemical fiber, rubber, plastic or the like are available on the market, but these seat cushions often have relatively simple structures and poor air permeability (especially in summer), and a driver or passengers (referred to as users hereinafter) will be caused to feel discomfort in the buttocks after sitting or leaning for a long time, therefore it is very important to improve the design to solve this problem.

Since the conventional automobile seat cushions are restricted to single-layer heat dissipation and heat dissipation passages are liable to be blocked due to collapse and fail to form an air circulation path, the existing automobile seat cushions can not satisfy the requirements of efficient and timely heat dissipation.

SUMMARY

In order to overcome the above disadvantages, an automobile seat cushion with an air permeability is provided in the present disclosure, and the seat cushion comprises: a body shaped like a flat sheet that has a top surface in contact with the buttocks of a user and a bottom surface in contact with an automobile seat; a plurality of protrusions that are distributed under the bottom surface of the body and provided to vertically protrude downward from the bottom surface, the plurality of protrusions being formed integrally with the body of the seat cushion; and a plurality of vertical ventilation holes that are formed to be recessed downward from the top surface of the body, the plurality of vertical ventilation holes and the plurality of protrusions being in one-to-one correspondence vertically, wherein each vertical ventilation hole of the plurality of vertical ventilation holes vertically extends downward beyond the bottom surface of the body from the top surface of the body, and enters into a corresponding protrusion but does not penetrate through a bottom of the corresponding protrusion, and wherein each protrusion of the plurality of protrusions is provided with a horizontal ventilation hole that penetrates through at least one side surface of the protrusion, and the horizontal ventilation hole and the vertical ventilation hole meet and communicate with each other in the protrusion.

In the automobile seat cushion of the present disclosure, the plurality of protrusions or the plurality of vertical ventilation holes are arranged into a two-dimensional array along two directions intersecting with each other in a horizontal plane and spaced apart from each other at a predetermined interval.

In the automobile seat cushion of the present disclosure, the two directions in which the plurality of protrusions or the plurality of vertical ventilation holes are arranged are perpendicular to each other.

In the automobile seat cushion of the present disclosure, the two directions in which the plurality of protrusions or the plurality of vertical ventilation holes are arranged are not perpendicular to each other.

In the automobile seat cushion of the present disclosure, the horizontal ventilation hole of one protrusion of the plurality of protrusions and the horizontal ventilation hole of the other protrusion adjacent to the one protrusion are aligned along at least one of the two directions.

In the automobile seat cushion of the present disclosure, both of the body and the plurality of protrusions of the seat cushion are made of porous foamed plastic or foamed rubber.

In the automobile seat cushion of the present disclosure, a total thickness of the seat cushion is 20 to 50 mm.

In the automobile seat cushion of the present disclosure, a concave portion is further provided on the top surface of the body, and the concave portion is formed like a U shape opened forward in a top view of the seat cushion.

In the automobile seat cushion of the present disclosure, a grasp portion is further provided at a front edge of the top surface of the body, and the grasp portion is a rectangular opening that vertically penetrates through the body and has a length ranging from 50 to 100 mm.

In the automobile seat cushion of the present disclosure, in a protrusion that is not adjacent to an end of the body in the at least one direction, the horizontal ventilation hole penetrates through two opposite side surfaces of the protrusion.

In the automobile seat cushion of the present disclosure, in a protrusion that is adjacent to an end of the body in the at least one direction, the horizontal ventilation hole penetrates through one or two side surfaces of the protrusion.

In the automobile seat cushion of the present disclosure, heights of the plurality of protrusions vertically protruding downward from the bottom surface of the body are uniform.

In the automobile seat cushion of the present disclosure, heights of the plurality of protrusions vertically protruding downward from the bottom surface of the body are not uniform.

With the specific heat dissipation structure in the automobile seat cushion of the present application, not only air free circulation between an interior and an exterior of the same protrusion but also air free circulation among interiors of different protrusions are realized, thereby forming an air circulation path. The heat generated will not be accumulated on the buttocks of the user to cause discomfort, thereby achieving the effect of improving air permeability and heat dissipation efficiency.

Figure 1:
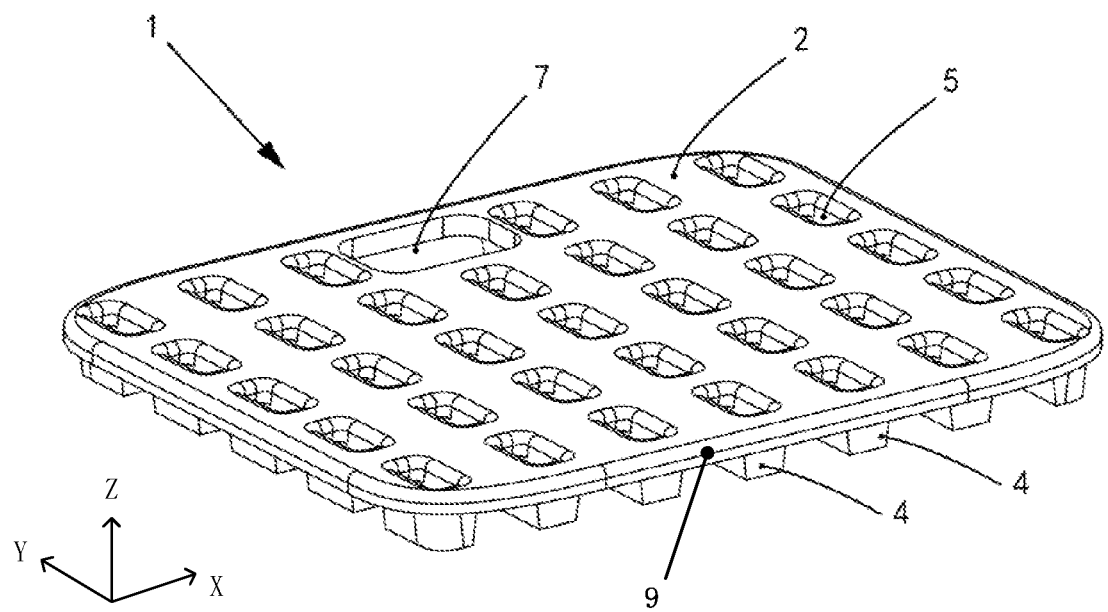
FIG. 1 is a schematic perspective diagram of an automobile seat cushion according to the present disclosure.

The meanings of the reference numerals in the drawings:
1—automobile seat cushion;
2—top surface;
3—bottom surface;
4—protrusions;
5—vertical ventilation holes;
6—horizontal ventilation holes;
7—grasp portion;
8—concave portion;
9—body.

DETAILED DESCRIPTION OF THE EMBODIMENTS

Specific embodiments of the present disclosure will be further described in detail below with reference to the drawings.

In the following description of the embodiments, terms concerning orientations such as "front", "rear", "left", "right", "up", "down" or the like are mentioned under a used state of an automobile seat cushion, and respectively refer to a front direction, a rear direction, a left direction, a right direction, an up direction and a down direction relative to a user himself/herself when the user sits on the seat cushion. For example, in the drawings, the front direction is a direction in which the Y axis is directed, and the rear direction is a direction opposite to the direction in which the Y axis is directed; the right direction is a direction in which the X axis is directed, and the left direction is a direction opposite to the direction in which the X axis is directed; the up direction is a direction in which the Z axis is directed, and the down direction is a direction opposite to the direction in which the Z axis is directed.

As shown in FIGS. 1-5, an automobile seat cushion 1 with an air permeability according to the present disclosure comprises: a body 9 shaped like a flat sheet that has a top surface 2 in contact with the buttocks of a user and a bottom surface 3 in contact with an automobile seat; a plurality of protrusions 4 that are distributed under the bottom surface 3 of the body 9 and provided to vertically (i.e., in an up-down direction) protrude downward from the bottom surface 3, wherein the plurality of protrusions 4 are formed integrally with the body 9 of the seat cushion 1; and a plurality of vertical ventilation holes 5 that are formed to be recessed downward from the top surface 2 of the body 9, wherein the plurality of vertical ventilation holes 5 and the plurality of protrusions 4 are in one-to-one correspondence vertically (i.e., in an up-down direction). In the automobile seat cushion 1 of the present disclosure, each vertical ventilation hole of the plurality of vertical ventilation holes 5 vertically extends downward beyond the bottom surface 3 of the body 9 from the top surface 2 of the body 9, and enters into a corresponding protrusion 4 but does not penetrate through a bottom of the corresponding protrusion 4; each protrusion of the plurality of protrusions 4 is provided with a horizontal ventilation hole 6 that penetrates through at least one side surface of the protrusion 4, and the horizontal ventilation hole 6 and the vertical ventilation hole 5 meet and communicate with each other in the protrusion 4 to form a ventilation passage in an inverted T shape or an L shape.

As described above, each vertical ventilation hole 5 vertically extends downward beyond the bottom surface 3 of the body 9 from the top surface 2 of the body 9, and enters into a corresponding protrusion 4 but does not penetrate through a bottom of the corresponding protrusion 4, which means that a depth of the vertical ventilation hole 5 recessing downward from the top surface 2 of the body 9 is greater than a thickness of the body 9 in the Z axis and smaller than a sum of the thickness and a height of the protrusion 4 protruding downward from the bottom surface 3 of the body 9.

Figure 2:
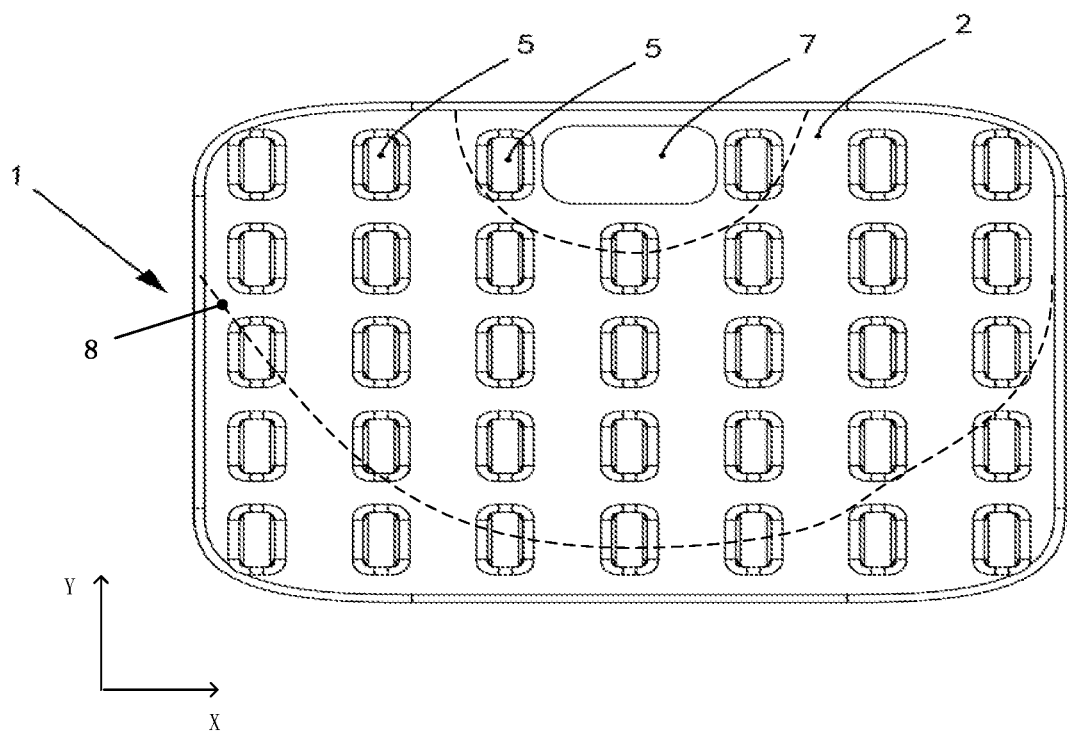
FIG. 2 is a top view of the automobile seat cushion according to the present disclosure.
Figure 3:
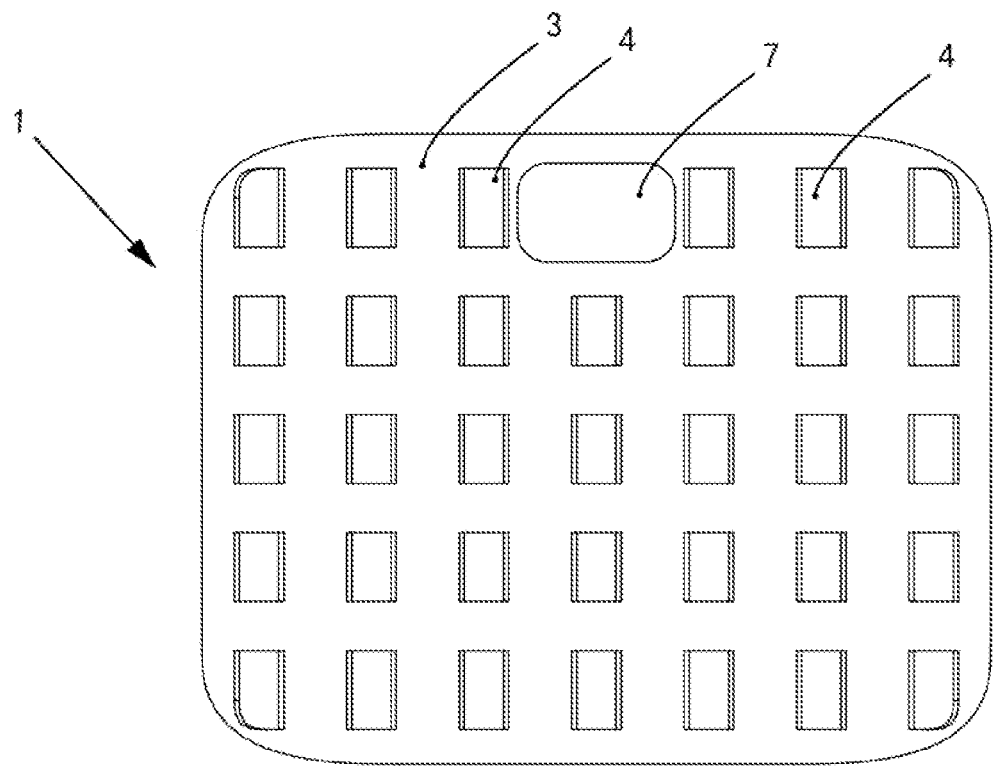
FIG. 3 is a bottom view of the automobile seat cushion according to the present disclosure.

In an embodiment shown in FIGS. 1-3, the plurality of protrusions 4 or the plurality of vertical ventilation holes 5 are arranged into a two-dimensional array along two (arrangement) directions intersecting with each other in a horizontal plane and spaced apart from each other at a predetermined interval.

In the embodiment shown in FIGS. 1-3, the two (arrangement) directions in which the plurality of protrusions 4 or the plurality of vertical ventilation holes 5 are arranged are perpendicular to each other (one arrangement direction is parallel to the X axis, and the other arrangement direction is parallel to the Y axis). Optionally, the two (arrangement) directions in which the plurality of protrusions 4 or the plurality of vertical ventilation holes 5 are arranged are not perpendicular to each other (for example, the two arrangement directions mutually form an acute angle or an obtuse angle not equal to 90 degrees).

In the embodiment shown in FIGS. 1-3, the horizontal ventilation hole 6 of one protrusion of the plurality of protrusions 4 and the horizontal ventilation hole 6 of the other protrusion adjacent to the one protrusion are aligned along at least one (referred to as an alignment direction hereinafter) of the two arrangement directions. In regard to a method of manufacturing the automobile seat cushion of the present disclosure, for example, the body 9 with the protrusions 4 of the seat cushion 1 is formed by integral molding at first, and then the vertical ventilation holes 5 and the horizontal ventilation holes 6 are fabricated sequentially.

The ventilation principle of the automobile seat cushion 1 of the present disclosure resides in that when the user sits on the seat cushion 1, the top surface 2 of the body 9 of the seat cushion 1 is in contact with the buttocks of the user, and heat and sweat generated by the buttocks of the user are vertically transmitted downward through the air in the vertical ventilation hole 5 in the protrusion 4, and then dissipated in a horizontal direction through the air in the horizontal ventilation hole 6 in the protrusion 4. Since the horizontal ventilation hole 6 of one protrusion of the plurality of protrusions 4 and the horizontal ventilation hole 6 of the other protrusion adjacent to the one protrusion are aligned along at least one of the two arrangement directions, the external cold air among the plurality of protrusions 4 can sufficiently contact and be fully mixed with the hot air carrying heat discharged from each protrusion, and the external cold air continuously enters into the horizontal ventilation hole 6 and vertical ventilation hole 5 of each protrusion and conducts heat exchange. The part of the vertical ventilation hole 5 below the bottom surface 3 of the body 9 (i.e., the part located within the protrusion 4) and the horizontal ventilation hole 6 also constitute a transitional buffer region between the hot air and the cold air to make heat transmission more uniform. According to the specific heat dissipation structure of the present application, not only air free circulation between an interior and an exterior of the same protrusion but also air free circulation among interiors of different protrusions are realized, thereby forming an air circulation path. The heat generated will not be accumulated on the buttocks of the user, thereby achieving the effect of improving air permeability and heat dissipation efficiency.

In one embodiment, both of the body 9 and the protrusions 4 of the seat cushion 1 of the present disclosure are made of an elastic material or a flexible material (e.g., porous foamed plastic or foamed rubber) to prevent sinkage or collapse of a heat dissipation passage. By a supporting function of the protrusions 4, volumes of the vertical ventilation holes 5 and the horizontal ventilation holes 6 in the protrusions 4 when the user sits down will not be fully compressed and reduced to zero.

To guarantee comfortability of the seat cushion 1, a total thickness (including a thickness of the body 9 and protruding heights of the protrusions 4) of the seat cushion 1 is 20 to 50 mm, for example. In addition, sizes, shapes and the number of the protrusions 4 and the vertical ventilation holes 5 are not particularly limited, as long as positions of the protrusions 4 and those of the vertical ventilation holes 5 vertically correspond to one another up and down. Both of the protrusions 4 and the vertical ventilation holes 5 shown in the drawings are shaped in a substantially rectangular parallelepiped, and may also be a prism or a pyramid with a polygonal horizontal cross section.

In one embodiment, heights of the plurality of protrusions 4 vertically protruding downward from the bottom surface 3 of the body 9 of the seat cushion 1 are uniform (the heights are unique); and in another embodiment, heights of the plurality of protrusions 4 vertically protruding downward from the bottom surface 3 of the body 9 of the seat cushion 1 are not uniform (the heights are not unique) to match a fluctuant shape of an upper surface of an automobile seat so that the top surface 2 of the body 9 of the seat cushion 1 can be kept substantially horizontal when the seat cushion 1 is placed on the automobile seat.

To improve comfortability of the automobile seat cushion 1, a concave portion 8 is further provided on the top surface 2 of the body 9, and the concave portion 8 is formed like a U shape opened forward in a top view of the seat cushion 1 to substantially match shapes of the thighs and the buttocks of the user in a sitting posture, as shown by two broken lines in FIG. 2.

Further, as shown in FIGS. 2-3, a grasp portion 7 is further provided in a substantially central position at a front edge of the top surface 2 of the body 9 of the seat cushion 1, and the grasp portion 7 vertically (i.e., in an up-down direction) penetrates through the body 9 of the seat cushion 1 so that the fingers or the hands of the user can pass through the grasp portion 7 to facilitate the user to take and carry the seat cushion 1; the position of the grasp portion 7 is determined so that the grasp portion 7 is just located under the perineum of the user when the buttocks of the user sit on the top surface 2 of the body 9 of the seat cushion 1, and thus the grasp portion 7 has another role of providing an accommodation space for the testes of a sitting male user to further improve comfortability of use.

As an example, the grasp portion 7 is an opening in a substantially rectangular shape, and the rectangular shape has a length slightly larger than a hand width of an adult, for example, ranging from 50 to 100 mm. The opening may also be another shape, for example, an ellipse, and the ellipse has a major axis length ranging from 50 to 100 mm.

Figure 4:
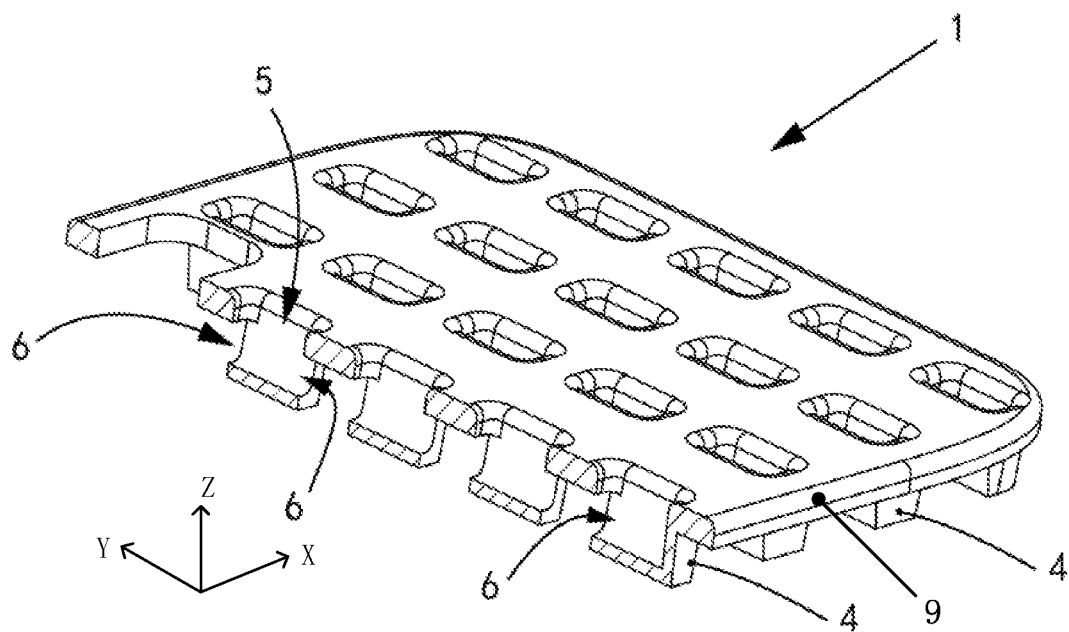
FIG. 4 is a sectional view taken along a front-rear direction of the automobile seat cushion according to the present disclosure.
Figure 5:
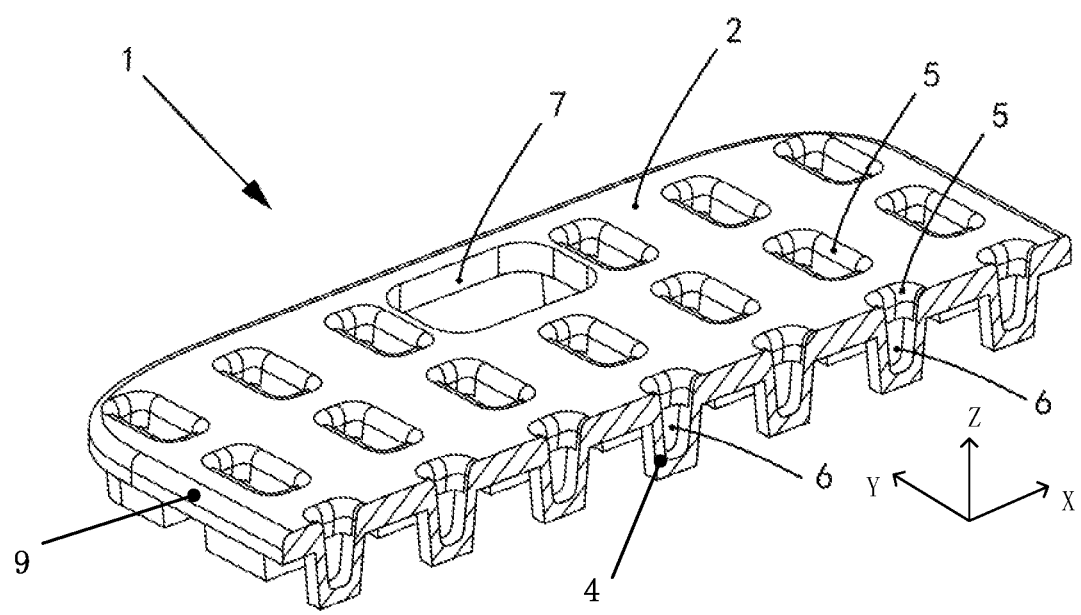
FIG. 5 is a sectional view taken along a left-right direction of the automobile seat cushion according to the present disclosure.

As shown in FIGS. 4-5, in a protrusion 4 that is not adjacent to an end of the body 9 in the above-mentioned alignment direction, the horizontal ventilation hole 6 penetrates through two opposite side surfaces of the protrusion 4. Further, in a protrusion 4 that is adjacent to an end of the body 9 in the above-mentioned alignment direction, the horizontal ventilation hole 6 penetrates through one or two side surfaces of the protrusion 4.

In the present application different from the conventional automobile seat cushion, in addition to the vertical ventilation hole 5 that is provided on the top surface 2 of the body 9 of the seat cushion 1 and extends downward from the bottom surface 3 of the body 9, the horizontal ventilation hole 6 is further provided below the bottom surface 3 of the body 9; the vertical ventilation hole 5 and the horizontal ventilation hole 6 that communicate with each other constitute the heat dissipation passage (a heat dissipation path) to guide the heat generated from the top surface 2 to the bottom surface 3, and the heat dissipation paths in the protrusions 4 are aligned with one another to facilitate heat exchange and prevent blockage due to collapse, thereby remarkably improving heat dissipation efficiency.

A main structure, a technical principle and advantages of the automobile seat cushion of the present application have been described above in connection with the specific embodiments, however, the above-mentioned embodiments are not intended to limit the present application. Without departing from the sprit or essence of the present application, all of any modifications, equivalent replacements and improvements made to the present application should fall within the protection scope of the present application.

What is claimed is:

1. An automobile seat cushion comprising:
   a body shaped like a flat sheet that has a top surface and a bottom surface;
   a plurality of protrusions that are distributed under the bottom surface of the body and provided to vertically protrude downward from the bottom surface, the plurality of protrusions being formed integrally with the body of the seat cushion; and
   a plurality of vertical ventilation holes that are formed to be recessed downward from the top surface of the body, the plurality of vertical ventilation holes and the plurality of protrusions being in one-to-one correspondence vertically,
   wherein each vertical ventilation hole of the plurality of vertical ventilation holes vertically extends downward beyond the bottom surface of the body from the top surface of the body, and enters into a corresponding protrusion but does not penetrate through a bottom of the corresponding protrusion, and
   wherein each protrusion of the plurality of protrusions is provided with a horizontal ventilation hole that penetrates through at least one side surface of the protrusion, and the horizontal ventilation hole and the vertical ventilation hole meet and communicate with each other in the protrusion.

2. The automobile seat cushion according to claim 1, wherein the plurality of protrusions or the plurality of vertical ventilation holes are arranged into a two-dimensional array along two directions intersecting with each other in a horizontal plane and spaced apart from each other at a predetermined interval.

3. The automobile seat cushion according to claim 2, wherein the two directions in which the plurality of protrusions or the plurality of vertical ventilation holes are arranged are perpendicular to each other.

4. The automobile seat cushion according to claim 2, wherein the two directions in which the plurality of protrusions or the plurality of vertical ventilation holes are arranged are not perpendicular to each other.

5. The automobile seat cushion according to claim 2, wherein the horizontal ventilation hole of one protrusion of the plurality of protrusions and the horizontal ventilation hole of the other protrusion adjacent to the one protrusion are aligned along at least one of the two directions.

6. The automobile seat cushion according to claim 5, wherein in a protrusion that is not adjacent to an end of the body in the at least one direction, the horizontal ventilation hole penetrates through two opposite side surfaces of the protrusion.

7. The automobile seat cushion according to claim 5, wherein in a protrusion that is adjacent to an end of the body in the at least one direction, the horizontal ventilation hole penetrates through one or two side surfaces of the protrusion.

8. The automobile seat cushion according to claim 1, wherein a concave portion is further provided on the top surface of the body, and the concave portion is formed like a U shape opened forward in a top view of the seat cushion.

9. The automobile seat cushion according to claim 1, wherein a grasp portion is further provided at a front edge of the top surface of the body, and the grasp portion is a rectangular opening that vertically penetrates through the body and has a length ranging from 50 to 100 mm.

10. The automobile seat cushion according to claim 1, wherein both of the body and the plurality of protrusions of the seat cushion are made of porous foamed plastic or foamed rubber.

11. The automobile seat cushion according to claim 1, wherein a total thickness of the seat cushion is 20 to 50 mm.

12. The automobile seat cushion according to claim 1, wherein heights of the plurality of protrusions vertically protruding downward from the bottom surface of the body are uniform.

13. The automobile seat cushion according to claim 1, wherein heights of the plurality of protrusions vertically protruding downward from the bottom surface of the body are not uniform.

* * * * *